(12) United States Patent
Meisner et al.

(10) Patent No.: US 10,741,092 B1
(45) Date of Patent: Aug. 11, 2020

(54) APPLICATION OF HIGH-DIMENSIONAL LINGUISTIC AND SEMANTIC FEATURE VECTORS IN AUTOMATED SCORING OF EXAMINATION RESPONSES

(71) Applicant: ACT, INC., Iowa City, IA (US)

(72) Inventors: Richard Meisner, Iowa City, IA (US); Bradley Bolender, Iowa City, IA (US); Daniel Shaw, Iowa City, IA (US)

(73) Assignee: ACT, INC., Iowa City, IA (US)

( * ) Notice: Subject to any disclaimer, the term of this patent is extended or adjusted under 35 U.S.C. 154(b) by 289 days.

(21) Appl. No.: 15/618,971

(22) Filed: Jun. 9, 2017

(51) Int. Cl.
*G09B 7/02* (2006.01)
*G06F 40/30* (2020.01)
*G06F 40/284* (2020.01)

(52) U.S. Cl.
CPC ............ *G09B 7/02* (2013.01); *G06F 40/284* (2020.01); *G06F 40/30* (2020.01)

(58) Field of Classification Search
CPC ....................................................... G09B 7/02
USPC ........................................................ 434/353
See application file for complete search history.

(56) References Cited

U.S. PATENT DOCUMENTS

| | | |
|---|---|---|
| 9,037,967 B1 | 5/2015 | Al-Jefri |
| 9,542,383 B2 | 1/2017 | Kim |
| 9,740,769 B2 | 8/2017 | Bhagwat |
| 2002/0156763 A1 | 10/2002 | Marchisio |
| 2003/0048308 A1 | 3/2003 | Friedlander |
| 2003/0149692 A1 | 8/2003 | Mitchell |
| 2004/0175687 A1 | 9/2004 | Burstein |
| 2005/0142529 A1 | 6/2005 | Andreyev |
| 2012/0131015 A1 | 5/2012 | Al Badrashiny |
| 2012/0323573 A1 | 12/2012 | Yoon |
| 2013/0110498 A1 | 5/2013 | Bekkerman |
| 2013/0117368 A1 | 5/2013 | Dozier |
| 2014/0093845 A1 | 4/2014 | Kim |
| 2014/0317032 A1 | 10/2014 | Haberman |
| 2015/0154174 A1 | 6/2015 | Hoover |
| 2015/0194147 A1 | 7/2015 | Yoon |
| 2015/0243181 A1 | 8/2015 | Somasundaran |
| 2015/0254229 A1 | 9/2015 | Beigman Klebanov |
| 2017/0140659 A1 | 5/2017 | Alsanie |

*Primary Examiner* — Kesha Frisby
(74) *Attorney, Agent, or Firm* — Sheppard, Mullin, Richter & Hampton LLP

(57) ABSTRACT

A computer implemented method for evaluating examination responses includes receiving, with an examination evaluation server, an examination response, tokenizing the examination response into one or more n-word segments, extracting, from the response, a set of construct-relevant features indicating one or more scoring metrics, generating a set of scoring rules, and generating a score estimate as a function of one or more scoring rules from the set of scoring rules and one or more of the scoring metrics.

19 Claims, 9 Drawing Sheets

APPLICATION OF HIGH-DIMENSIONAL LINGUISTIC AND SEMANTIC FEATURE VECTORS IN AUTOMATED SCORING OF EXAMINATION RESPONSES

TECHNICAL FIELD

The disclosed technology relates generally to electronic testing, and more particularly various embodiments relate to systems and methods for automated evaluation of examination responses based on the detection and recognition of semantic and linguistic properties.

BACKGROUND

Automated examination evaluation tools have been ineffective at accurately capturing the full range of construct evidence in text responses (i.e., information contained in the response that signals the examinee's ability level in the assessment construct of interest). Many automated examination evaluation systems analyze small groups of features or patterns recognized within the text of an examination response as a proxy for an examinee's overall performance on the examination. For example, automated examination evaluation software may search for and detect specific expected responses in the form of words or phrases and add points for each positive response, and subtract points for each negative (e.g., expected, but incorrect) response. Automated examination evaluation software may also search for and detect other proxy features, such as numbers of words, numbers of characters per word, numbers of words per sentence, or other reductive variables.

These types of evaluation tools do not capture the full richness of evidence markers that would be processed by a human grader, and thus, provide an incomplete representation of the ability markers observed in high performing responses. Thus, existing automated scoring tools are unreliable at higher score ranges, are not equitable to the examinees, and are difficult to defend in terms of construct relevance, since they often produce a reasonably accurate performance at predicting scores for a majority of responses, but noticeably poor performance for students at specific (usually extreme) ability levels (e.g., the highest- or lowest-performing students). These types of evaluation systems are also easy to "game" by, for example, writing essays with many multi-syllable words. Moreover, many automated examination systems also do not accommodate a large number of feature inputs, and do not effectively combine features of substantially different characteristics.

Brief Summary of Embodiments

Systems and methods for high-dimensional feature-vector-based evaluation of examination responses are provided. In some embodiments, examination responses may be provided in the form of short answers, paragraphs, or multi-paragraph essays. The examination responses may be received by an examination evaluation server. The examination evaluation server may tokenize the examination responses, extract response features, and learn and apply a set of examination scoring rules. In some embodiments, the examination scoring rules may be based on response feature vectors. Response feature vectors may include n-grams as well as other linguistic or vocabulary based features as known in the art.

A feature vector may include sequences of words found in the response, as well as characteristics relating to words, phrases, and the response as a whole. Such characteristics may include proportions for certain parts of speech relative to the response as a whole, average number of characters or syllables, average vocabulary difficulty, etc.

In some embodiments, the examination evaluation server may also include a prediction and learning engine. The prediction and learning engine may compare the calculated score for each examination with a user-rated score. Adjustments to the prediction model may be implemented to reduce the error observed between calculated scores and user-rated scores. By performing multiple adjustments against multiple examination responses, the examination evaluation server may be trained and scoring accuracy improved.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
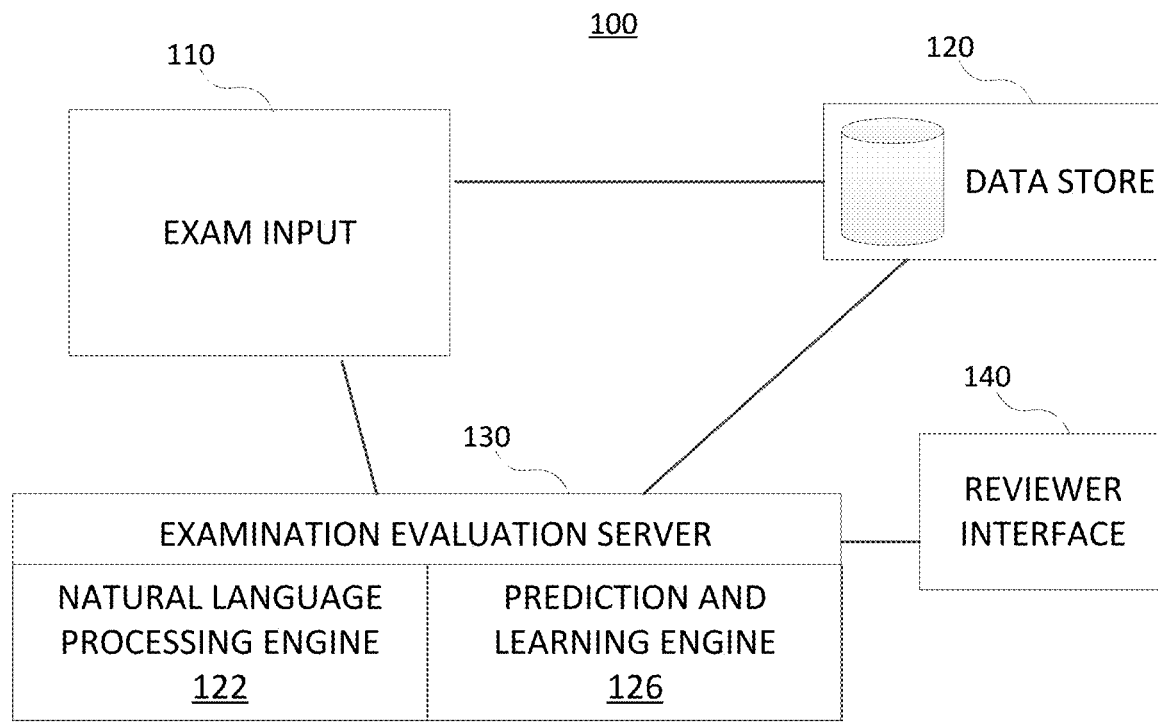
FIG. 1 illustrates an example system for automated examination scoring, consistent with embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward a system and method for automated examination scoring. More specifically, examples of the disclosed technology apply machine learning algorithms in an automated examination evaluation system. Embodiments of the automated examination evaluation system include a pattern recognition system configured to detect the presence of n-grams within an examination response. For example, a three-word string may be characterized as a "trigram" wherein occurrences of the particular trigram within an examination response may raise or lower an examination score. The system may be trained to identify the trigram and learn an appropriate score based on empirical comparisons with user-rated examinations. For example, a professor may grade the same examination, and input the score, along with grading criteria (what characteristics of the examination response led to the score) into a reviewer interface.

The system may learn over time the importance of the particular trigram to the overall score. The trigram's presence in responses may be measured as frequencies, binary indications of presence or absence, frequencies transformed to term frequency-inverse document frequency (TF-IDF), or another measure. Other trigrams, bigrams, unigram, 4-grams, or other n-grams may then be included in the scoring process. For example, there may be hundreds, thousands, or more n-grams included in the scoring and learning process.

Feature vector values may include any quantifiable characteristic of the examination response, including for example, proportions of certain parts-of-speech, average numbers of characters or syllables per word, level of vocabulary difficulty, average numbers of words per sentence, or other textual characteristics as known in the art. The feature vector may also include strings of words (word n-grams) or strings of parts of speech (part of speech n-grams). For example, in the case of a part-of-speech n-gram, the system may extract from the response a string of parts-of-speech (e.g., a 4-gram may be pronoun-noun-adverb-verb). Certain common words ("stop words" such as "a", "and", "the") may be filtered from an examination response prior to deriving the feature vectors.

Some embodiments of the disclosure provide a computer implemented method for evaluating examination responses. For example, may include receiving, with an examination evaluation server, an examination response. The examination response may be a user response to a standardized test, essay examination, short answer examination, or other examination or quiz as known in the art. The method may include tokenizing the examination response into one or more n-word segments. For example, tokenizing may include identifying single words or phrases in the content. In some examples, the single words or phrases are stored in a cache and made available for further processing. The single words or phrases may then be combined into contiguous n-word segments using a sliding window (e.g., a window that is 2 or more words longs) to capture a first n-word segment starting on the first word of the content, a second n-word segment starting on the second word of the content, a third n-word segment starting on the third word of the content, and so on.

In some examples, the content is pre-filtered to remove certain words with limited meaning, such as articles, the word the, or other words with limited meaning as known in the art. The pre-filtering may be performed before tokenizing the content or before combining the words or phrases into n-word segments. In some examples, each n-word segment may be a 3-word segment, a 4-word segment, a 5-word segment, or any other segment comprising multiple words. In some examples, tokenizing the content may include identifying n-word segments of different lengths.

The frequency that any particular n-word segment appears in the data source may be counted and included as a frequency value parameter correlated with each n-gram in the list. Accordingly, the list may include each n-word segment identified in the content being stored as an n-gram along with a corresponding frequency value parameter indicating how many times that particular n-word segment appears in the content.

The method may also include extracting, from the examination response, a set of construct-relevant features indicating one or more scoring metrics. For example, scoring metrics may include a complexity level, a vocabulary difficulty level, a lexical diversity level, or a measure of semantic similarity to exemplar training responses.

Some embodiments of the method include generating a set of scoring rules and generating a score estimate as a function of one or more scoring rules from the set of scoring rules and one or more of the scoring metrics. For example, generating the set of scoring rules may include analyzing a training set of user-assigned scores and a set of response feature vectors. In some examples, the method also includes comparing the score estimate to a user-assigned score. The method may also include receiving, from a reviewer interface, a user-assigned score corresponding to the examination response, storing the user-assigned score in a data store together with the score estimate. A plurality of historic user-assigned scores may then be received from the data store together with a plurality of corresponding score estimates and a conditional agreement value may be generated for each score point by determining a set of agreement rates and distribution spreads. For example, the method may include calculating a conditional agreement value for each score point using a cross-tab matrix of the historic user-assigned scores crossed with the plurality of corresponding score estimates to determine the set of agreement rates and distribution spreads. The method may also include generating an equally weighted condition agreement as a function of an average of a plurality of conditional agreement values across different score points. The "user" assigning user-assigned scores may be an exam reviewer, a third-party reviewer, a team of multiple exam reviewers, an automated system, or other types of users as known in the art (i.e., an entity capable of interacting with a user interface).

In some embodiments, the method may include deriving a feature vector for each response. For example, the feature vector may include one or more n-grams, wherein each n-gram may be extracted from the examination response. Each n-gram may be a string of words or a string of parts-of-speech. Deriving the feature vector may include receiving a randomization parameter and the set of scoring rules.

In some examples, the method includes applying a stochastic gradient boosting tree (GBT) algorithm to the set of feature vectors. For example, the GBT algorithm may include dividing the examination responses into a plurality of response groups, generating a group score estimate for each response group, and adjusting each group score estimate to minimize a scoring discrepancy between the group score estimate and a user-assigned group score.

Some embodiments of the disclosure provide a system for evaluating examination responses. For example, the system may include an examination evaluation server, a reviewer interface, and a data store. The examination evaluation server may include a processor and a non-transitory computer readable medium with computer executable instructions embedded thereon. The computer executable instructions may be configured to cause the processor to receive a set of scoring rules from the data store, receive an examination response from the data store, tokenize the examination response into one or more n-word segments, extract, from the response, a set of construct-relevant features indicating one or more scoring metrics, generate a set of scoring rules, and generate a score estimate as a function of one or more scoring rules from the set of scoring rules and one or more of the scoring metrics. In some examples, the one or more scoring metrics comprise a complexity level, a vocabulary difficulty, a lexical diversity, or a semantic similarity to exemplar training responses.

In some embodiments, the computer executable instructions may be further configured to cause the processor to compare the score estimate to a user-assigned score. The system may also analyze a training set of user-assigned scores and a set of response feature vectors. The system may also test scoring accuracy by comparing predicted scores to a test set of responses and user-assigned scores. In some examples, the system may derive a feature vector for each response, the feature vector comprising one or more n-grams, each n-gram being extracted from the examination response, as well as construct-relevant features. Each n-gram may include a string of words or a string of parts-of-speech.

In some examples, the computer readable instructions may be further configured to cause the processor to receive a randomization parameter and the set of scoring rules. The system may also apply a GBT algorithm to the set of feature vectors. For example, the GBT algorithm may include dividing the examination responses into a plurality of response groups, generating a group score estimate for each response group, and adjusting each group score estimate to minimize a scoring discrepancy between the group score estimate and a user-assigned group score.

The system may also receive, from the reviewer interface, a user-assigned score corresponding to the examination response, store the user-assigned score in the data store together with the score estimate, receive, from the data store, a plurality of historic user-assigned scores and a plurality of corresponding score estimates, and generate a conditional agreement value for each score point by determining a set of agreement rates and distribution spreads using a cross-tab matrix of the historic user-assigned scores crossed with the plurality of corresponding score estimates. In some embodiments, the system may also generate an equally weighted condition agreement as a function of an average of a plurality of conditional agreement values across different score points, e.g., across all the score points on the score scale.

In some examples, the method may include receiving and storing user-assigned scores corresponding to multiple examination responses together with score estimates for each of the examination responses. For each score point, a Conditional Agreement by Scorepoint (CABS) may be generated by calculating a cross-tab matrix of the historic user-assigned scores crossed with the historic score estimates as estimated by the examination evaluation server, and determining a set of agreement rates and distribution spreads for the cross-tab matrix. Some examples may include generating an Equally Weighted Condition Agreement (EW-CA) as a function of an average of the CABSs across different score points.

To provide insight and quality assurance, characteristics of the automated examination scoring model may be queried. The GBT scoring model may be queried to produce a measure of the reduction in error attributable to each feature extracted from responses. Features extracted from responses may be arranged in descending order by this measure of error reduction to provide insights about what variables are the most important for determining an accurate estimate of the target score.

While determining the importance of features for accurate score estimates is useful, it may not provide an indication of the actual effect of particular values of features on the estimate in terms of the direction, e.g., whether an increase in feature value cause an increase or a decrease in the estimated score, or of the size of the effect. To determine these characteristics, the GBT scoring model may be queried to produce a visual indication of the effects of individual variables. The scoring model may be used to generate score estimates as the variable in question is varied across all observed values when the other variables are held constant at their real values for each response in the data. A user may observe the effect of a single variable on all individual responses to determine whether extensive, complex interactions are present, represented by a high level of variation in the trace lines. A user may also observe the average effect of a variable on responses to determine the size of the effect, in general, when the system varies the value of the variable across multiple observed values while the other variables are held constant at the average values observed across multiple responses in the data set.

FIG. 1 illustrates an example system for automated examination scoring in accordance with embodiments of the systems and methods disclosed herein. In some embodiments, a system for automated examination scoring 100 includes an examination input device 110. For example, examination input device 110 may include a scanner, a computer, a tablet, a mobile device, or other electronic input devices as known in the art. The input device 110 may further include a graphical user interface, for example, to present an electronic examination to a user and accept responses to the examination. The responses may be in the form of multiple choice, short answer, essay, or other response formats as would be known in the art.

Exam input device 110 may communicatively couple to data store 120. Data store 120 may include a database housed on local storage, network attached storage, cloud-based storage, a storage area network, or other data storage devices as known in the art. Data store 120 may also include a vocabulary repository or corpus. For example, a corpus may be a dictionary or encyclopedia. In some examples, the corpus may be topic-specific, such as a corpus containing vocabulary specific to medicine, physics, chemistry, biology, history, literature, psychology, sociology, astronomy, or other topics as would be known in the art. The corpus may be made available to the examination evaluation server to derive semantic word vectors and to provide n-gram frequency lists relevant to a particular examination topic. In some embodiments, user-created corpuses may also be stored in data store 120.

Both exam input device 110 and data store 120 may be communicatively coupled to examination evaluation server 130. As used herein, communicatively coupled may mean a direct or indirect connection between or among the entities to exchange information (e.g., in the form of electrical or electromagnetic signals) with each other over a wired or wireless communication link. Examples of such a communication link can include a computer bus, a local area network, a wide area network, a wireless network, or other electronic or electromagnetic communication links.

Examination evaluation server 130 may include a computer processor and a non-transitory computer readable medium with computer executable instructions embedded thereon. The computer executable instructions may be configured to perform response feature extraction, machine learning model training, and automated examination scoring as disclosed herein. For example, the computer executable instructions may be configured as a natural language processing (NLP) engine 122 and a prediction and learning engine 126. NLP engine 122 may be configured to receive examination responses from examination input device 110 or data store 120 and apply an automated examination scoring routine, e.g., feature extraction, as disclosed herein. Prediction and learning engine 126 may be configured to derive and modify a set of scoring rules and compare automated scoring results to manual scoring results entered through reviewer interface 140, and further configured to modify or calibrate a set of scoring rules applied by NLP engine 122.

Reviewer interface 140 may be a computer, a tablet, a mobile device, or other electronic input devices as known in the art. In some examples, reviewer interface 140 may include a graphical user interface configured to display examination responses and enable a reviewer to score the examination responses. In some examples, the reviewer interface 140 may also accept reasons from the reviewer as to why particular scores were assigned to the examination. Those reasons may be relevant to or assist with iterative modification of the set of extracted response features. Reviewer interface 140 may also include a diagnostic interface to enable a reviewer to view an examination response that was scored by the examination evaluation server along with a learned decision tree indicating how a score was calculated (e.g., which response features were identified and how those features were weighted in deriving the overall score). Reviewer interface 140 may also include a configuration interface that enables a user to change settings and parameters used by examination evaluation server 130. For example, a user may manually add or remove response features, adjust machine learning parameters, enter corpuses or links thereto, or perform other related system tuning.

Figure 2:
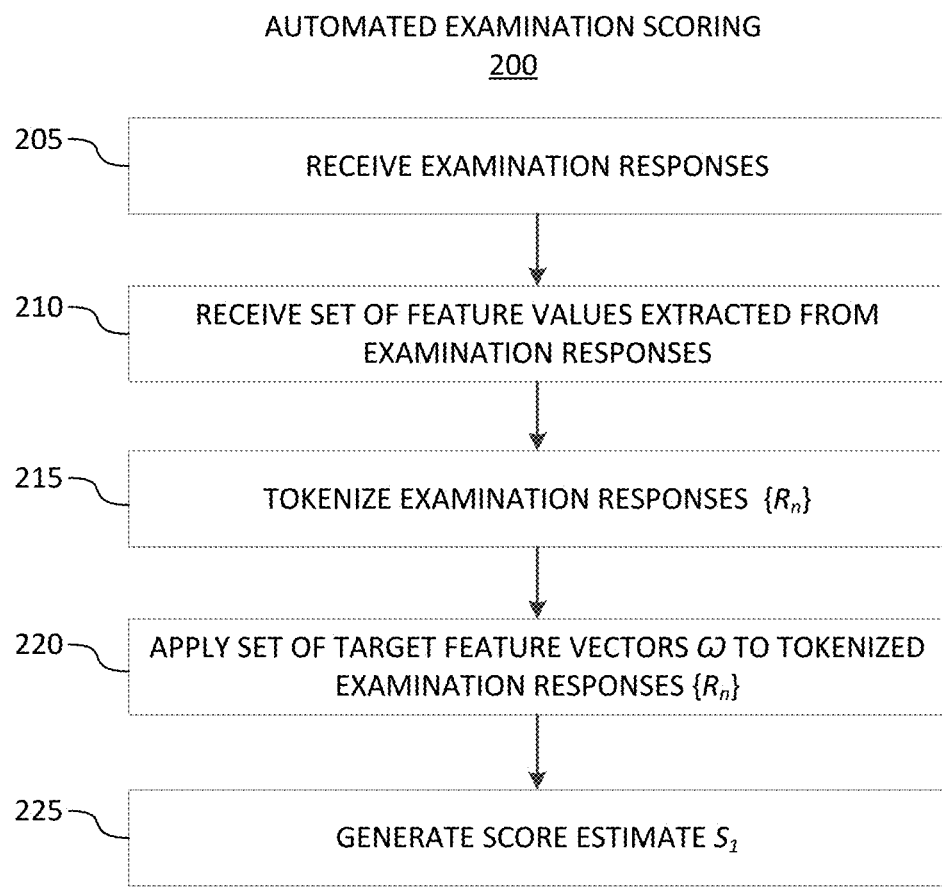
FIG. 2 is a flow chart illustrating an example method for automated examination scoring, consistent with embodiments disclosed herein.

FIG. 2 is a flow chart illustrating an example method for automated examination scoring in accordance with one embodiment of the systems and methods described herein. In some embodiments, an automated examination scoring method 200 may include receiving a set of examination responses at step 205 and receiving a set of features extracted from the examination responses at step 210. For example, the set of features may include response n-grams, semantic word vectors, and NLP features (including measures of vocabulary difficulty, lexical diversity, proposition density, word and sentence complexity, etc.) As used herein, n-grams may be a plurality of related objects identified in a string of text within an examination response. For example, a 3-gram may be a string of three words present in the response (e.g., "three little bears"). The set of feature vectors may include a combination of holistic construct-relevant features with word n-grams and semantic vectors in one high-dimensional predictor matrix.

Particular n-grams may be expected within a particular examination response according to the set of scoring rules. And n-gram may also be related to grammar or parts of speech. For example, an n-gram may be a pre-identified sequence of verbs, nouns, adverbs, or adjectives (e.g., an n-gram including an adjective-noun-adverb-verb sequence). Some n-grams may include synonyms, antonyms, homonyms, or the like. Some n-grams vectors may be assigned negative, as opposed to positive relevance coefficients. For example, a 3-gram that includes synonyms may be assigned a positive relevance coefficient (as to raise an overall examination response score), whereas a 3-gram that includes antonyms or homonyms may be assigned a negative relevance coefficient (as to lower an overall examination response score).

Some n-grams may be sequences of words including a predefined number or range of syllables, or sentences including a predefined number or range of words. Sets of n-grams may be specific to certain topics, such as history, science, literature, popular culture, or other topics as known in the art. A set of vocabulary related n-grams may also be grouped by context, grade level, geography, or other factors and may color the types of vocabulary used by a particular test taker.

N-grams may be grouped in various sizes. For example, n-grams may be unigrams, bigrams, trigrams, 4-grams, etc. In the case of vocabulary, a unigram may be a single word. A bigram may be a string of two words, a trigram may be a string of three words, etc. Similarly, unigrams, bigrams, trigrams, 4-grams, and the like may be strings of characters, words, terms, phrases, or sentences from the response. They may also include specific patterns of parts-of-speech, numbers of letters or syllables, contextual relevance (e.g., based on frequency within a particular corpus or topic-related database), level of vocabulary, or other related metrics.

In some embodiments, feature vectors may include n-grams and other scoring relevant information associated with the response. The automated examination scoring method 200 may select which feature vectors to evaluate based on a randomization parameter and in which order to apply them based on the reduction in error. For example, the method may apply a stochastic gradient boosting engine using a randomization parameter to make a determination as to which feature vectors to evaluate in the set of examination responses.

The stochastic gradient boosting method may be used to assist in the process of training an prediction and learning engine disclosed herein. Accordingly, in some embodiments, feature vectors may be evaluated in a predetermined order, and each with a predetermined weight, to determine the most probable score for a particular examination. In other embodiments, the order in which feature vectors are evaluated may change according to the stochastic gradient boosting method when applied to reduce the error between engine-predicted scores and human reference scores. Still in other embodiments, some feature vectors may not be evaluated at all on a given application of the automated examination scoring method 200. In some examples, feature vectors may be non-homogenous, as to include mixes of holistic measures, word n-grams, part-of-speech n-grams, semantic similarity quantities, or other types of features in a single high-dimensional vector.

Together, a set of feature vectors may comprise a predictor matrix ω. In initial applications of automated examination scoring method 200 to results from a particular examination, a target set of feature vectors may be selected from a set of previous examination scoring rules stored in data store 120, or input by a user through reviewer interface 140.

Still referring to FIG. 2, an automated examination scoring method 200 may also include tokenizing examination responses into words or sentences. The output from step 215 may be a tokenized set of examination responses $\{R_n\}$. The tokenized set of examination responses $\{R_n\}$ may be a set of n-word segments related to a particular section or sub topic within the examination, or may be related to the examination as a whole. Tokenizing the set of examination responses may include segmenting each examination response into one or more n-word segments. For example, an n-word segment may be a string of two or more consecutive words. The number of words in each segment may be predetermined and/or configured by a user through the reviewer interface, or may be included in the set of scoring rules.

Method 200 may further include learning and applying a set of scoring rules to the tokenized examination responses. For example, the set of scoring rules may include the target feature vectors. The scoring rules may be applied to the set of tokenized examination responses $\{R_n\}$ at step 220.

Feature vectors within the predictor matrix may be evaluated in a randomized order. In some examples, each feature vector may be evaluated by applying the stochastic gradient boosting method to generate a score estimate $S_1$ at step 225.

Figure 3:
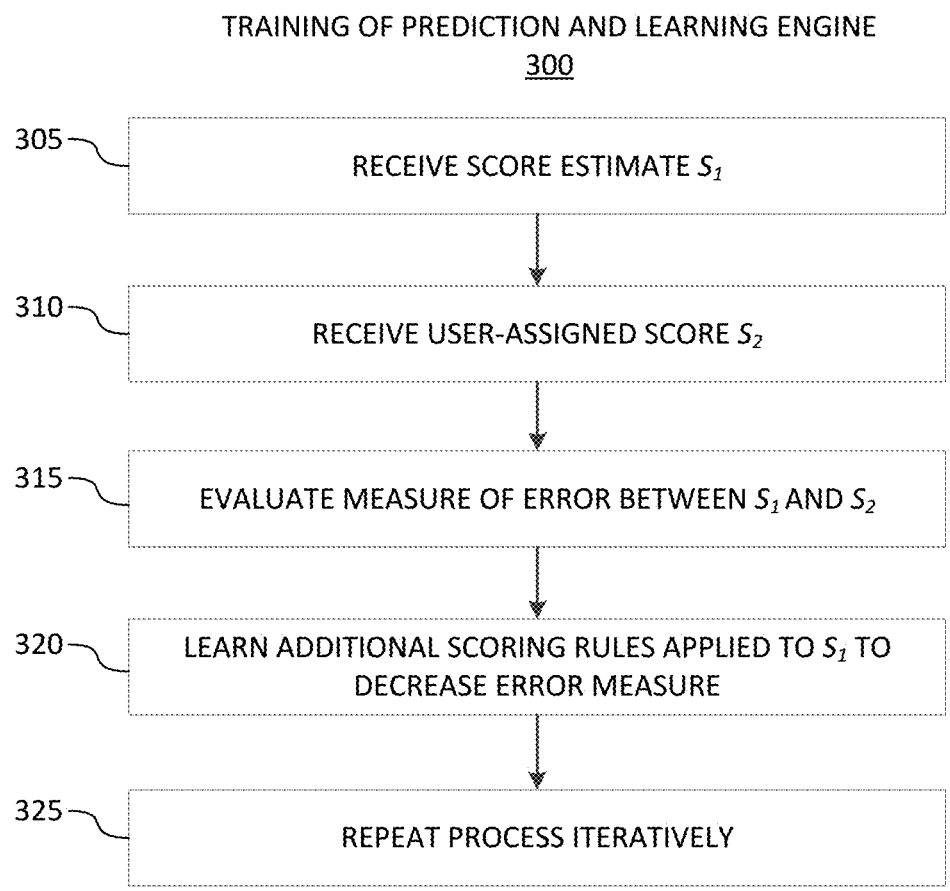
FIG. 3 is a flow chart illustrating an example method for training prediction and learning engine, consistent with embodiments disclosed herein.

FIG. 3 is a flow chart illustrating an example method for training prediction and learning engine in accordance with one embodiment of the systems and methods described herein. In some embodiments, a method for training and prediction and learning engine 300 may include receiving a vector of score estimates $S_1$ at step 305 and receiving a vector of user assigned scores 52 at step 310. Method 300 may then include observing the feature vectors while evaluating a measure of error between $S_1$ and $\underline{S}_2$. Through applying stochastic gradient boosting, scoring rules may be added that adjust $S_1$ to reduce the observed error.

In some embodiments, method 300 may further include repeating steps 305 through 320 iteratively. Each time a new score estimate $S_1$ may be received, for example as an output of automated examination scoring method 200. Scoring estimate $S_1$ may then be compared to a previous, or a new user assigned score $S_2$, and a new measure of error. Use of the stochastic gradient boosting process may adjust the manner (e.g., the order according to a randomization parameter, application of, and weighting) in which the feature vectors of the tokenized examination responses are observed, such that a different score may be calculated through each run of the automated examination scoring method 200, even on the same set of examination responses. Part of the adjustment process, then, may include adjusting the randomization parameter as training becomes more refined, for example, through multiple iterations. An additional part of the process includes tuning the number of iterations to execute to attain an optimized automated examination scoring model. As a result, a tuned stochastic gradient boosted automated examination scoring model may be generated through multiple iterations of methods 200 and 300.

Figure 4:
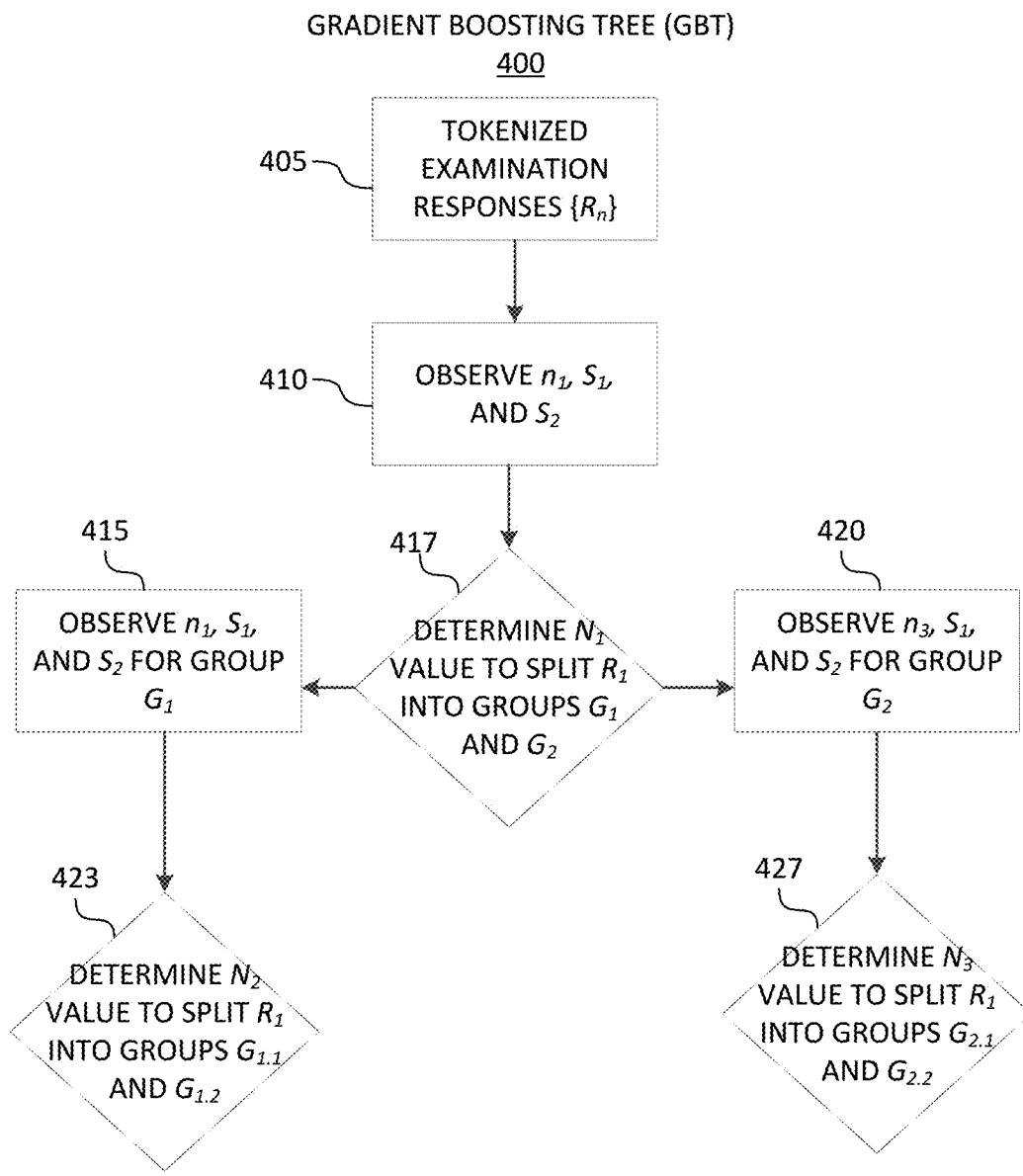
FIG. 4 is a flow chart illustrating an example method for applying a gradient boosting tree (GBT) to a method for automated examination scoring, consistent with embodiments disclosed herein.

FIG. 4 is a flow chart illustrating an example method for applying a gradient boosting tree (GBT) to a method for automated examination scoring in accordance with one embodiment of the systems and methods described herein. An example GBT method 400 may include receiving a set of tokenized examination responses at step 405 and iteratively observing the predictor matrix for all responses. For example, in a first iteration at step 140, observe feature vector $N_1$, automated NLP Engine estimate $S_1$, and user input score $S_2$.

At step 417, determine what value of $N_1$ shall be used to split $R_1$ into groups, $G_1$ and $G_2$, whose scoring engine estimates $S_1$ are adjusted separately to improve error observed between $S_1$ and $S_2$. The decision tree may proceed by observing feature vector $N_1$ and determination is made of what value of feature n1 shall be used to split examination responses $R_1$ into groups whose automated prediction and learning engine estimates $S_1$ will be adjusted separately to improve the error observed between $S_1$ and $S_2$. This iterative process may progress down the decision tree at either step 423 or step 427 depending on which branch of the tree the algorithm proceeds down.

The decision tree may proceed at step 423 by observing feature vector n2 and determination is made of what value of feature $N_2$ shall be used to split examination responses $R_1$ into groups whose automated prediction and learning engine estimates $S_1$ will be adjusted separately to improve the error observed between $S_1$ and $S_2$ On the other side of the tree, at step 427, a similar iterative process may proceed, taking the gradient boosting tree algorithm deeper and deeper down the decision tree. The order in which feature vectors may be evaluated may vary, for example, according to the estimates $S_1$ and feature vectors evaluated in previous sections of the tree, as well as according to the randomization parameter. Thus, the GBT method 400 may be tuned as part of the method for training the NLP Engine 300.

Figure 5:
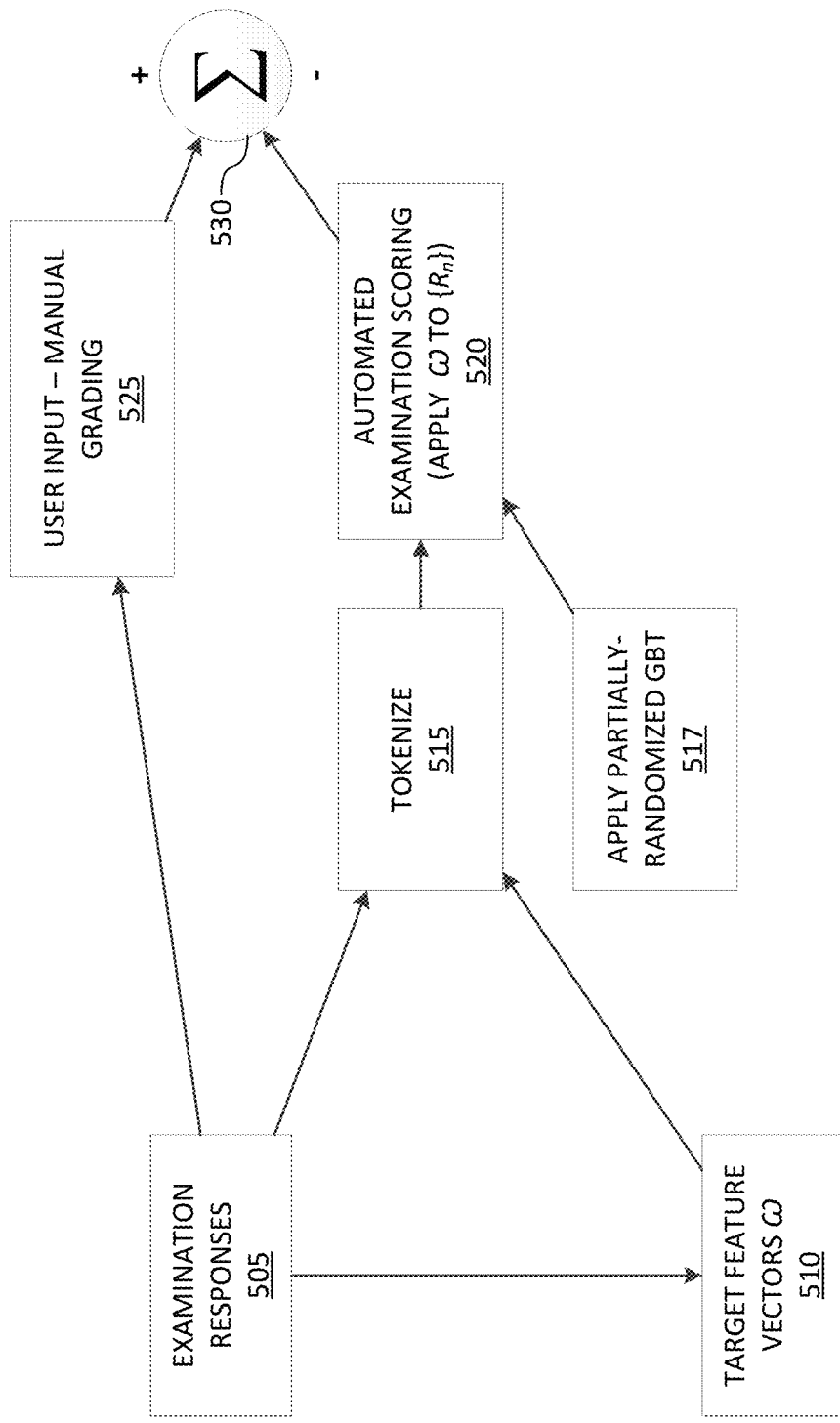
FIG. 5 illustrates an example method for automated examination scoring and training an prediction and learning engine, consistent with embodiments disclosed herein.

FIG. 5 illustrates an example method for automated examination scoring and training an prediction and learning. As illustrated, two inputs may be provided: (1) examination responses 505; and (2) a target set of feature vectors 510. The target set of feature vectors 510 may be derived from tokenized examination responses 515, as disclosed with respect to FIG. 2. In some embodiments, a partially randomized GBT 517 may be applied to target feature vectors at 520 to enhance the automated examination scoring estimates as disclosed with respect to FIG. 4.

A scoring estimate may then be provided to comparator 530. Comparator 530 may then return a measure of error between automated examination scoring estimates and human rater reference scores. As illustrated, this process may be iteratively applied to tune prediction and learning engine 126. In some examples, prediction and learning engine 126 may be tuned using this iterative process across a large subset of examination responses. For example, if a large group of students takes the same examination, a first subset of that group of examination responses may be used to tune prediction and learning engine 126.

Once tuned, prediction and learning engine 126 may be used to score the remaining group of validation test set examination responses, in order to validate that the scoring engine is producing scores that are sufficiently well-aligned to human scores. This occurs without user input, or at least without substantial user input, as some scores may still be spot-checked for quality assurance purposes. In some examples, after the algorithm hyperparameters of prediction and learning engine 126 are tuned, the first subset of examination responses may be re-scored to provide a more accurate result.

In some examples, prediction and learning engine 126 logs all scoring results, along with the respective set of scoring rules detailing the computational prediction process, inclusive of the feature vector space used to accomplish the scoring, to data store 120. Accordingly, in the event a dispute arises involving a disagreement over a particular score of a particular examination response, the log may be retrieved and reviewed to determine exactly how the score was calculated. If an error is determined, prediction and learning engine 126 may be re-tuned.

Figure 6:
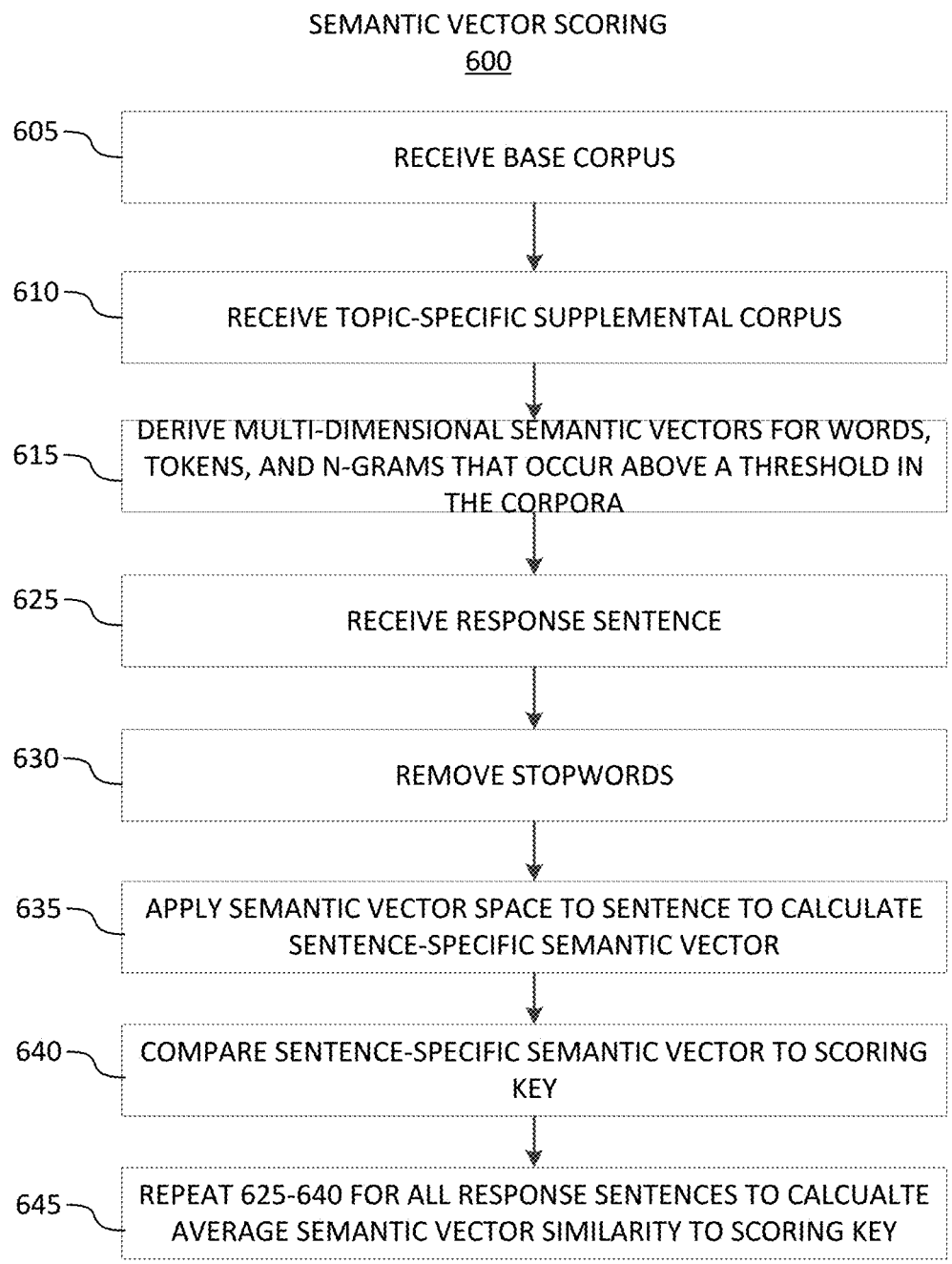
FIG. 6 is a flow chart illustrating an example method for semantic vector scoring, consistent with embodiments disclosed herein.

FIG. 6 is a flow chart illustrating an example method for the semantic vector component of scoring. As illustrated, a method for semantic vector scoring 600 may include receiving a base corpus of vocabulary at step 605. For example, the base corpus may be a general encyclopedia of vocabulary, such as the Corpus of Contemporary American English, Wikipedia, or other large corpora. Semantic vector scoring method 600 may also include receiving a topic specific supplemental corpus at step 610. For example, the topic specific supplemental corpus may be specific to a particular subject, such as science, literature, history, or other relevant topics. The topic may be more granular (e.g., biology, chemistry, physics, etc.), and multiple supplemental corpuses may be used.

A semantic vector scoring method 600 may further include deriving a multidimensional semantic vector space from the available corpuses at step 615, such that a vector in semantic space is derived for each word in the corpus using a word embedding method known in the art (e.g., word2vec or GLoVE). Word vectors that are near in semantic space correspond to words that are near in meaning.

The semantic vector scoring method 600 may also include receiving an examination response at step 625. For example, the examination response may be a response sentence or sentences from a full examination response. The method may further include pre-processing the examination response at step 630. For example, pre-processing the examination response may include tokenizing the response into words and sentences, and removing "stop words," such as commonly appearing words (e.g., "the", "a", "it", etc.) which are not relevant to the scoring analysis. Pre-processing the examination response may also include spell checking the examination response. Once the pre-processing is completed, semantic vector scoring method 600 may include deriving a semantic vector for each sentence in the response by averaging the semantic vectors of the words comprising the sentence.

The method may then include comparing sentence semantic vectors for the examinee response to similarly derived sentence semantic vectors from a scoring key (i.e., an exemplar training response with a particular score, used for training human scorers), at step 640. For example, the scoring key may be an example training essay response at the "3" score point.

The cosine similarity values for each sentence pair or segment may be compiled into a semantic vector scoring matrix representing the overall sentence similarities between the examination response and a scoring key.

In some examples, the cosine similarity values for each sentence or segment may be identified, for example, as a similarity score, p. An average score for the response sentence may be generated. In some examples, the average of the p greatest pairwise sentence similarity quantities (pairing each sentence from the examinee response with each sentence from the training response) may then be used as an overall response similarity quantity.

The process may be repeated iteratively for multiple response sentences to calculate an average semantic vector similarity with respect to the scoring key at step 645. Each of the response sentences within an examination response may be averaged or summed to calculate a final score.

Figure 7:
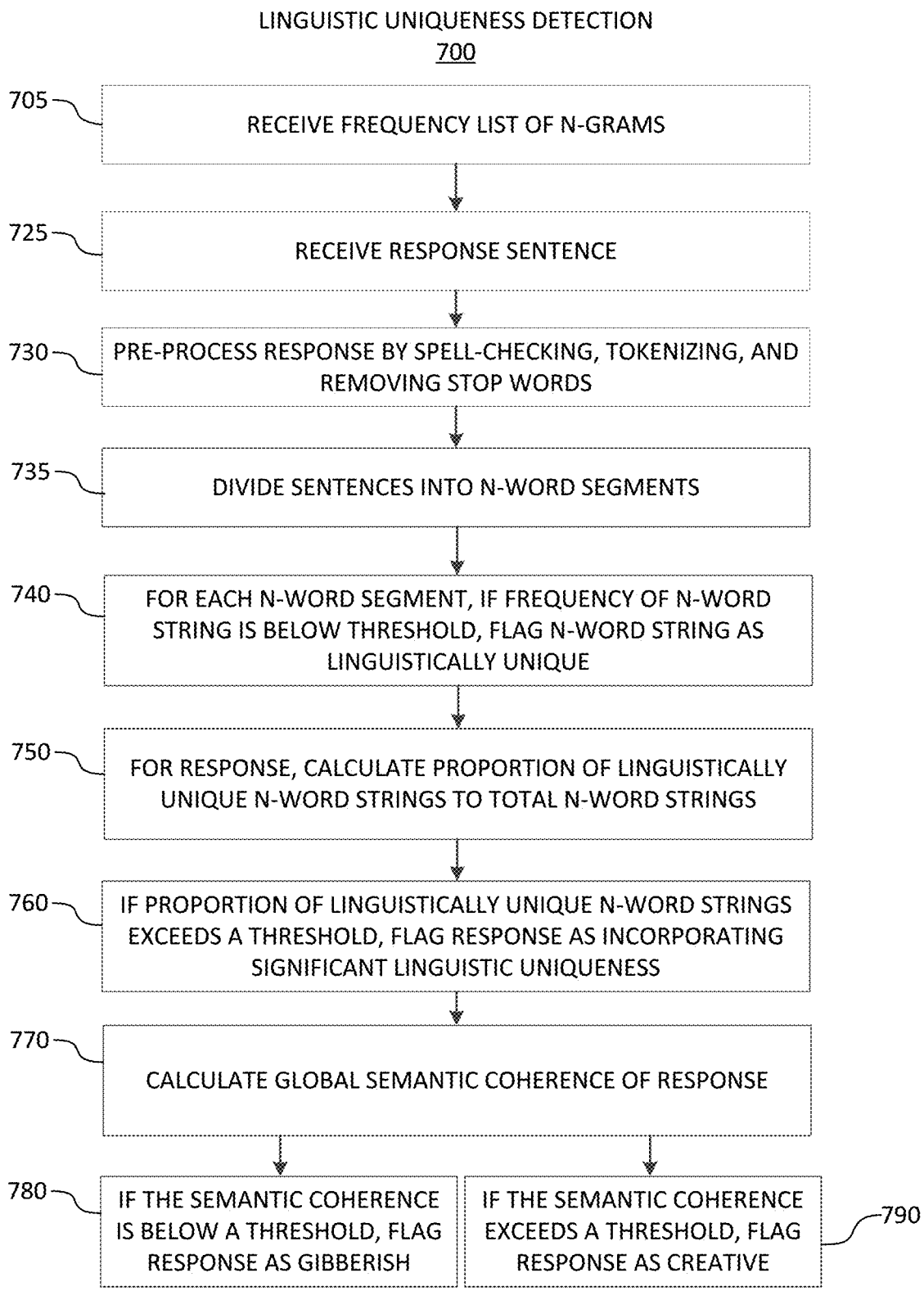
FIG. 7 is a flow chart illustrating an example method for detecting linguistic uniqueness, consistent with embodiments disclosed herein.

FIG. 7 is a flow chart illustrating an example method for detecting linguistic uniqueness, whether undesirable (gibberish) or desirable (creativity). As used herein, gibberish may be words, phrases, or sentences that are unrelated or nonresponsive to the examination question. In some examples, linguistically uncommon terms are entered by a test-taker to "game" the system. This is because many automated examination evaluation systems look for non-contextual length-based score indicators, such as numbers of words, numbers of syllables, numbers of characters, etc. A test-taker may know that these types of scoring indicators are in place and attempt to write sentences with large numbers of multi-syllable words, for example, to improve the test-taker's score, even though the answer itself is nonresponsive to the question.

As illustrated, a method for detecting linguistic uniqueness 700 may include receiving a list at step 705. The list may include n-grams from one or more language corpuses. The frequency that any particular n-gram appears in the corpus may be included as a parameter stored with each n-gram in the list. In some examples, if an n-gram appears below a threshold frequency in a particular corpus, the n-gram is not included in the list.

The linguistic uniqueness detection method 700 may also include receiving an examination response at step 725. For example, the examination response may be a response sentence or sentences from a full examination response. The method may further include pre-processing the examination response at step 730. For example, pre-processing the examination response may include tokenizing the response into words and sentences, and removing "stop words," such as commonly appearing words (e.g., "the", "a", "it", etc.) which are not relevant to the scoring analysis. Pre-processing the examination response may also include spell checking the examination response.

Once the filtering is completed, linguistic uniqueness detection method 700 may include dividing the examination response into n-word segments (e.g., one or more n-word segments may be identified within each sentence) at step 735. The method may also include flagging examination response sentence(s) as potentially incorporating linguistic uniqueness if any of the n-word segments match an n-gram stored in the list with a frequency value that falls below a threshold value. Accordingly, terms or phrases that are rarely or never found in available corpuses (e.g., vocabulary databases) may be flagged as potentially containing linguistic uniqueness. A user may then review the flagged results and make a determination as to whether the flagged terms are gibberish or are highly creative, but coherent answers.

In some examples, method for detection of linguistic uniqueness 700 may also include determining whether an essay includes unusually original or creative writing, as opposed to gibberish. For example, an essay including unusual phrasing may signify gibberish in some cases, or high creativity in others. To distinguish between gibberish and high creativity, the method for linguistic uniqueness detection 700 may include determining whether examination response sentences include n-word segments that do not appear frequently within a corpus. If such n-word segments are detected within the examination response sentence, the method may include calculating sematic coherence of the suspect n-word segment with other n-grams identified with high frequency within the corpus.

Semantic coherence is a measure of the interrelatedness of parts of the text. The methods may compare overlap in words and word meanings to calculate a semantic coherence coefficient. If an examination response includes multiple n-word segments that do not appear frequently in the base or target corpus, but which do exhibit high semantic coherence with other response n-grams that do appear frequently in either corpus, then the examination response may be flagged as highly creative, as opposed to incorporating gibberish. In some examples, a user may review examination responses flagged as including gibberish or being highly creative and indicate agreement or disagreement with the assessment. The reviewer's input may be incorporated into the system to adjust sensitivities to gibberish detection and/or high creativity detection.

Figure 8:
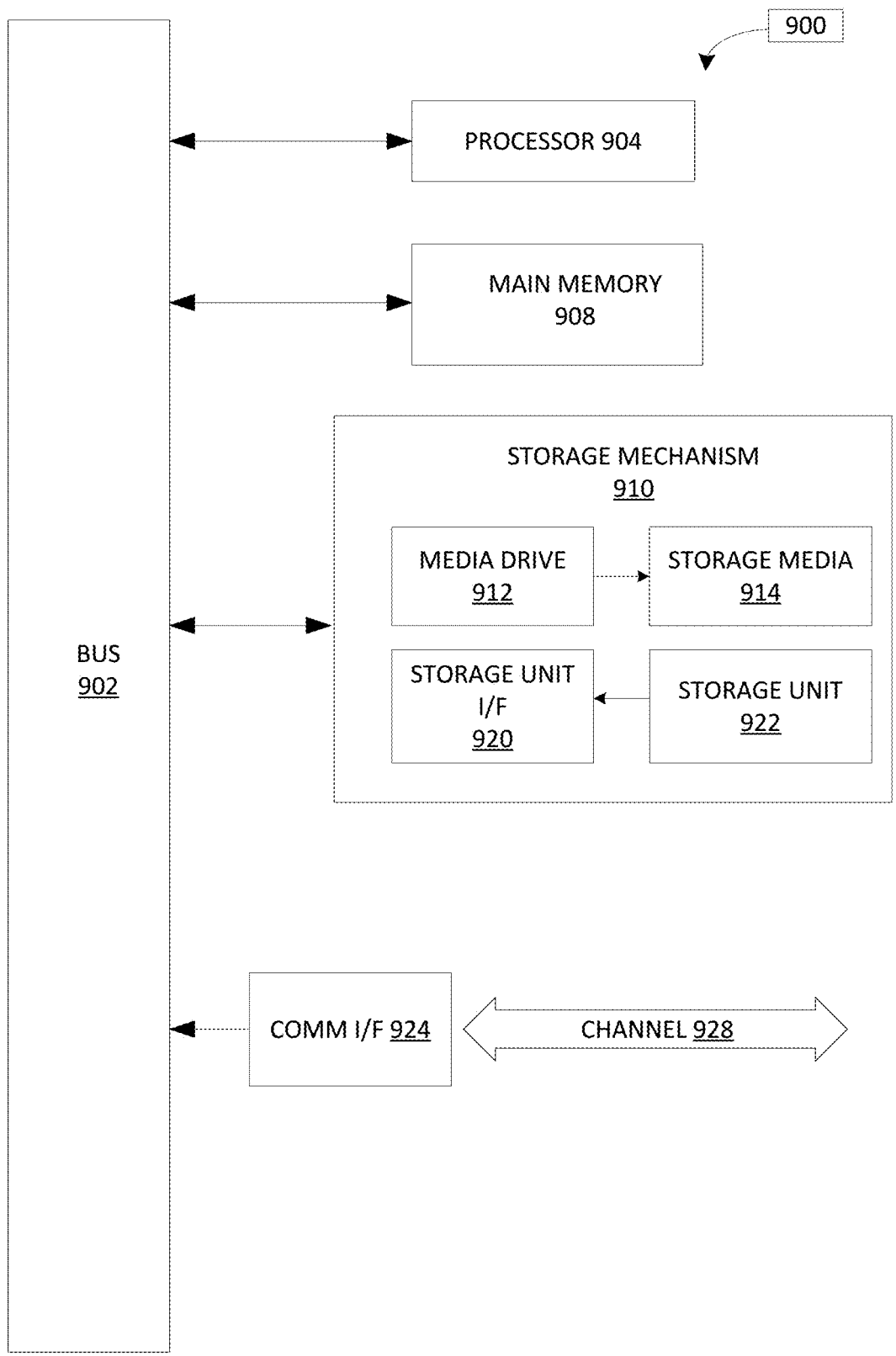
FIG. 8 illustrates an example computing system that may be used in implementing various features of embodiments of the disclosed technology.

As used herein, the term engine might describe a given unit of functionality that can be performed in accordance with one or more embodiments of the technology disclosed herein. As used herein, an engine might be implemented utilizing any form of hardware, software, or a combination thereof. For example, one or more processors, controllers, ASICs, PLAs, PALs, CPLDs, FPGAs, logical components, software routines or other mechanisms might be implemented to make up a engine. In implementation, the various engines described herein might be implemented as discrete engines or the functions and features described can be shared in part or in total among one or more engines. In other words, as would be apparent to one of ordinary skill in the art after reading this description, the various features and functionality described herein may be implemented in any given application and can be implemented in one or more separate or shared engines in various combinations and permutations. Even though various features or elements of functionality may be individually described or claimed as separate engines, one of ordinary skill in the art will understand that these features and functionality can be shared among one or more common software and hardware elements, and such description shall not require or imply that separate hardware or software components are used to implement such features or functionality.

Where components or engines of the technology are implemented in whole or in part using software, in one embodiment, these software elements can be implemented to operate with a computing or processing engine capable of carrying out the functionality described with respect thereto. One such example computing engine is shown in FIG. 8. Various embodiments are described in terms of this example computing engine 900. After reading this description, it will become apparent to a person skilled in the relevant art how to implement the technology using other computing engines or architectures.

Referring now to FIG. 8, computing system 900 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing engine 900 might also represent computing capabilities embedded within or otherwise available to a given device. For example, a computing engine might be found in other electronic devices such as, for example, digital cameras, navigation systems, cellular telephones, portable computing devices, modems, routers, WAPs, terminals and other electronic devices that might include some form of processing capability.

Computing system 900 might include, for example, one or more processors, controllers, control engines, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing engine 900 or to communicate externally.

Computing system 900 might also include one or more memory engines, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing engine 900 might likewise include a read only memory ("ROM") or other static storage device coupled to bus 902 for storing static information and instructions for processor 904.

The computing system 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 190 might include other similar instrumentalities for allowing computer programs or other instructions or data to be loaded into computing engine 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory engine) and memory slot, a PCMCIA slot and card, and other fixed or removable storage units 922 and interfaces 920 that allow software and data to be transferred from the storage unit 922 to computing engine 900.

Computing engine 900 might also include a communications interface 924. Communications interface 924 might be used to allow software and data to be transferred between computing engine 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing engine 900 to perform features or functions of the disclosed technology as discussed herein.

Figure 9:
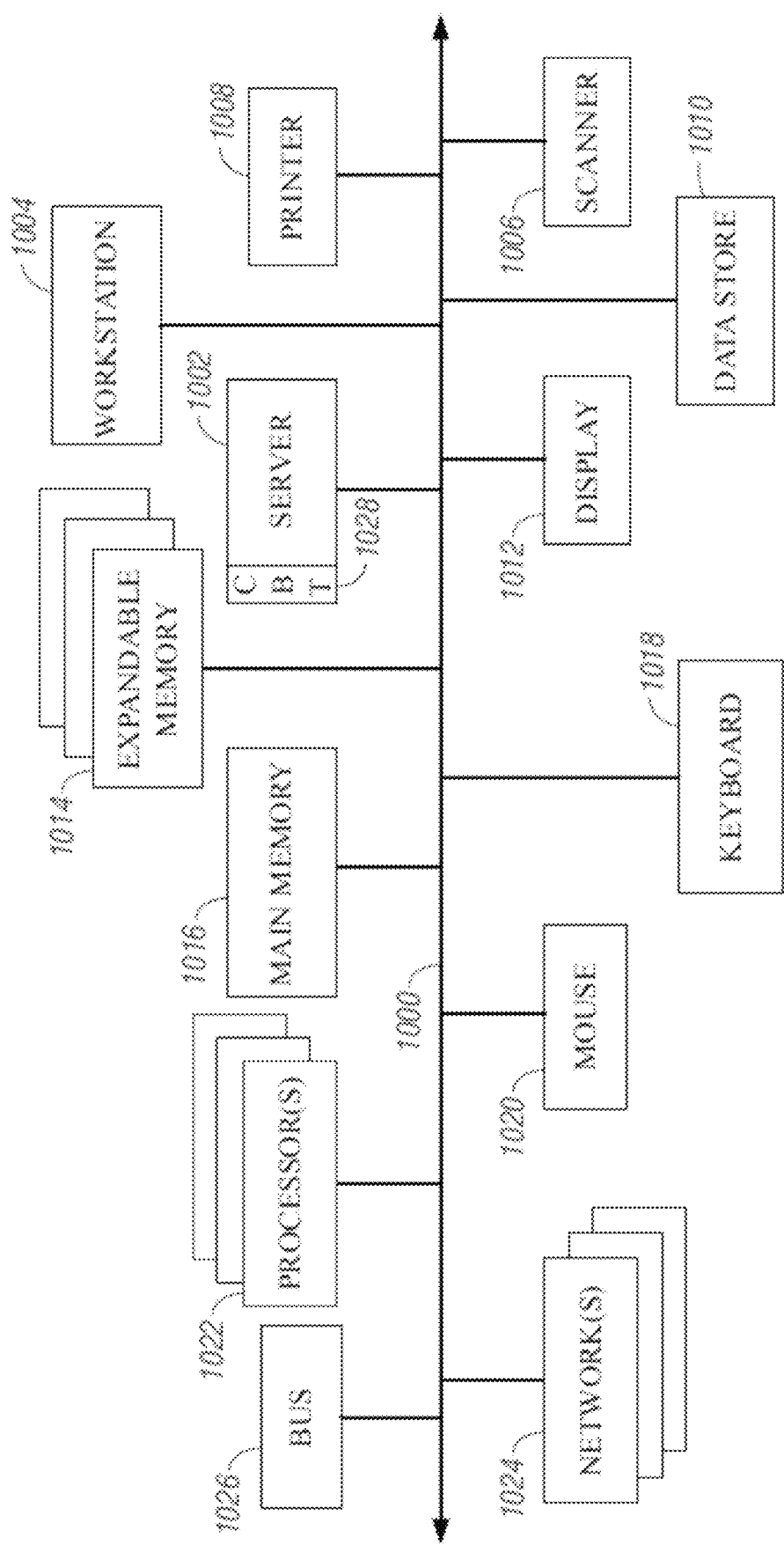
FIG. 9 is a block diagram for a computer network and system that may be used in implementing various features of embodiments of the disclosed technology.

FIG. 9 is a block diagram pictorially representing a computer network 1000 in which the disclosed embodiment of examination evaluation server 130 may be implemented. As shown in FIG. 9, the computer network 1000 includes, for example a server 1002, workstation 1004, scanner 1006, printer 1008, data store 1010, an expandable memory 1014, display 1012, keyboard 1018, main memory 1016, processors 1022, bus 1026, mouse 1020, and other like networks. The computer networks may be configured to provide a communication path for each device of the computer network to communicate with other like devices. Additionally, the computer networks 1024 may be the internet, a public switchable telephone network, a local area network, private wide area network, wireless network, or any of the like for communicating with an electronic device of the present invention.

In some embodiments of the disclosure, the server 1002 may be configured to execute any one or more of the protocols, processes or operations of this disclosure, provide outputs for display on the electronic device and receive inputs from the electronic device. In various other embodiments, the electronic device may be configured to execute any one or more operations associated with administering a test electronically or receiving responses to an exam electronically from a paper-delivered test booklet or cooperatively with one or more other electronic devices, computers, or workstations. A scanner 1006 may be configured to scan textual content and output the content into a computer readable format for one or more operations of the disclosure. Additionally, the printer 1008 may be configured to output the content from one or more operations of the disclosure, a score report, and scoring metrics on a media, such as paper. Furthermore, data associated with one or more operations of the present disclosure may be stored on a data store. The data store may be a local or a remote data store and may additionally be configured to receive and/or forward some or all of the stored data relating to an operation of the present disclosure. Moreover, in yet another embodiment, some or all of the operations, processes or procedures of the present disclosure may be subsumed within a single device, such as an electronic device.

Although FIG. 9 depicts a computer network, it is understood that the disclosure is not limited to operation with a computer network, but rather, the disclosure may be practiced in any suitable electronic device. Accordingly, the computer network depicted in FIG. 9 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of a engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

We claim:

1. A computer implemented method for evaluating examination responses, the method comprising:
   receiving, with an examination evaluation server, an examination response;
   tokenizing the examination response into one or more n-word segments;
   extracting, from the examination response, a set of construct-relevant features indicating one or more scoring metrics, wherein construct relevant features comprise complexity level, a vocabulary difficulty level, a lexical diversity level, and a semantic similarity score, and wherein extracting the semantic similarity score comprises:
      generating one or more semantic vectors for each sentence in the examination response, wherein each semantic vector is an average of the semantic vectors of words comprising the sentence,
      generating a set of cosine similarity values, wherein each cosine similarity value is a function of the comparing the one or more semantic vectors for each sentence in the examination response and a set of similarly derived sentence semantic vectors, and
      generating the semantic similarity score, as an average of the set of cosine similarity values; and
   using the one or more scoring metrics as input for a trained machine-learning based examination scoring engine to score the examination response,
   wherein the trained machine-learning based examination scoring engine is trained by:
      generating, via a prediction and learning engine, a score estimate of a training examination response,
      receiving via a reviewer interface, a user-assigned score for the training examination response,
      determining an error between the score estimate by comparing the score prediction to the user-assigned score, and
      adjusting the machine-learning based examination scoring engine based upon the determined error between the score prediction and user-assigned score.

2. The computer implemented method of claim 1, wherein generating the set of scoring rules comprises analyzing a training set of user-assigned scores and a set of response feature vectors.

3. The computer implemented method of claim 1, further comprising:
   deriving a feature vector for each response, wherein the set of feature vectors comprise one or more n-grams, and wherein each n-gram is extracted from the examination response.

4. The computer implemented method of claim 3, wherein each n-gram comprises a string of words or a string of parts-of-speech.

5. The computer implemented method of claim 3, wherein deriving the set of feature vectors comprises receiving a randomization parameter and the set of scoring rules.

6. The computer implemented method of claim 3, further comprising:
   applying a stochastic gradient boosting tree (GBT) algorithm to the set of feature vectors.

7. The computer implemented method of claim 6, wherein applying the GBT algorithm comprises:
   dividing the examination responses into a plurality of response groups;
   generating a group score estimate for each response group; and
   adjusting each group score estimate to minimize a scoring discrepancy between the group score estimate and a user-assigned group score.

8. The computer implemented method of claim 1, further comprising:
   receiving, from the reviewer interface, a user-assigned score corresponding to the examination response;
   storing the user-assigned score in a data store together with the score estimate;
   receiving, from the data store, a plurality of historic user-assigned scores and a plurality of corresponding score estimates; and
   generating a conditional agreement value for each score point by determining a set of agreement rates and distribution spreads using a cross-tab matrix of the historic user-assigned scores crossed with the plurality of corresponding score estimates.

9. The computer implemented method of claim 8, further comprising generating an equally weighted conditional agreement as a second function of an average of a plurality of conditional agreement values across different score points.

10. A system for evaluating examination responses comprising:
    an examination evaluation server;
    a reviewer interface; and
    and a data store,
    wherein the examination evaluation server comprises a processor and a non-transitory computer readable medium with computer executable instructions embedded thereon, the computer executable instructions configured to cause the processor to:
       receive, with the examination evaluation server, an examination response;
       tokenize the examination response into one or more n-word segments;
       extract, from the examination response, a set of construct-relevant features indicating one or more scoring metrics, wherein construct-relevant features comprise complexity level, a vocabulary difficulty level, a lexical diversity level, and a semantic similarity score, and wherein extracting the semantic similarity score is a process to:
          generate one or more semantic vectors for each sentence in the examination response, wherein each semantic vector is an average of the semantic vectors of words comprising the sentence,
          generate a set of cosine similarity values, wherein each cosine similarity value is a function of the comparing the one or more semantic vectors for each sentence in the examination response and a set of similarly derived sentence semantic vectors, and
          generate the semantic similarity score, as an average of the set of cosine similarity values; and
       use the one or more scoring metrics as input for a trained machine-learning based examination scoring engine to score the examination response,
       wherein the trained machine-learning based examination scoring engine is trained by a process to:
          generate, via a prediction and learning engine, a score estimate of a training examination response, receive via the reviewer interface, a user-assigned score for the training examination response, determine an error between the score estimate by comparing the score prediction to the user-assigned score, and adjust the machine-learning based examination scoring engine based upon the determined error between the score prediction and user-assigned score.

11. The system of claim 10, wherein the computer executable instructions are further configured to:

cause the processor to analyze a training set of user-assigned scores and a set of response feature vectors.

12. The system of claim 11, wherein the computer readable instructions are further configured to cause the processor to:

test scoring accuracy by comparing predicted scores to a test set of responses and user-assigned score.

13. The system of claim 12, wherein the computer readable instructions are further configured to cause the processor to:

derive a feature vector for each response, wherein the set off feature vectors comprise one or more n-grams, and wherein each n-gram is extracted from the examination response.

14. The system of claim 13, wherein each n-gram comprises a string of words or a string of parts-of-speech.

15. The system of claim 13, wherein the computer readable instructions are further configured to cause the processor to:

receive a randomization parameter and the set of scoring rules.

16. The system of claim 13, wherein the computer readable instructions are further configured to cause the processor to:

apply a gradient boosting tree (GBT) algorithm to the set of feature vectors.

17. The system of claim 16, wherein the GBT algorithm causes the processor to:

divide the examination responses into a plurality of response groups; generate a group score estimate for each response group; and adjust each group score estimate to minimize a scoring discrepancy between the group score estimate and a user-assigned group score.

18. The system of claim 10, wherein the computer readable instructions are further configured to cause the processor to:

receive, from the reviewer interface, a user-assigned score corresponding to the examination response;

store the user-assigned score in the data store together with the score estimate;

receive, from the data store, a plurality of historic user-assigned scores and a plurality of corresponding score estimates; and generate a conditional agreement value for each score point by determining a set of agreement rates and distribution spreads using a cross-tab matrix of the historic user-assigned scores crossed with the plurality of corresponding score estimate.

19. The system of claim 18, wherein the computer readable instructions are further configured to generate an equally weighted condition agreement as a second function of an average of a plurality of conditional agreement values across different score points.

* * * * *